United States Patent [19]

Rostoker

[11] 4,392,111
[45] Jul. 5, 1983

[54] METHOD AND APPARATUS FOR ACCELERATING CHARGED PARTICLES

[75] Inventor: Norman Rostoker, Irvine, Calif.

[73] Assignee: Maxwell Laboratories, Inc., San Diego, Calif.

[21] Appl. No.: 195,521

[22] Filed: Oct. 9, 1980

[51] Int. Cl.³ .................. H05H 7/00; H05H 11/00
[52] U.S. Cl. ............................ 328/237; 376/129; 376/133
[58] Field of Search ..................... 376/127–129, 376/133, 124; 328/233, 236, 237

[56] References Cited

U.S. PATENT DOCUMENTS

| | | | |
|---|---|---|---|
| 2,297,305 | 9/1942 | Kerst | 328/237 |
| 2,394,072 | 2/1946 | Westendorp | 328/237 |
| 2,533,859 | 12/1950 | Wideroe | 328/237 |
| 2,553,305 | 5/1951 | Dickinson | 328/237 |
| 2,558,597 | 6/1951 | Westendorp | 328/237 |
| 2,640,923 | 6/1953 | Pollock | 328/237 |
| 2,697,167 | 12/1954 | Kerst | 328/237 |
| 2,738,420 | 5/1956 | Lawson | 376/127 |
| 3,085,173 | 4/1963 | Gibson et al. | 376/138 |
| 3,614,638 | 10/1971 | Ananiev et al. | 328/237 |
| 3,663,362 | 5/1972 | Stix | 376/127 |
| 3,728,217 | 4/1973 | Dandl | 376/138 |
| 3,749,639 | 7/1973 | Kapitza | 376/124 |
| 3,831,101 | 8/1974 | Benford et al. | 376/127 |
| 3,975,689 | 8/1976 | Geizer et al. | 328/237 |
| 4,244,782 | 1/1981 | Dow | 376/146 |

OTHER PUBLICATIONS

Thesis U. C. at Irvine, Investigation of Nonneutral Magnetically Confined Electron Plasmas, Ekchouse, 1978.
DNA-4297F-2 Advanced Simulation Res., vol. II, Vacuum Energy Storage, 9/30/75, Mawell Labs.
M. S. Livingston and J. P. Blewett, *Particle Accelerators* (McGraw Hill, New York, 1962), Ch. 7.
D. W. Kerst, G. D. Adams, H. W. Koch, and C. S. Robinson, Phy. Rev. 78, 297 (1950).
J. F. Daugherty, J. Eninger, and G. S. Janes, AVCO Everett Research Report 375, Oct. 1971.
A. Fisher, P. Gilad, F. Goldin, R. Prohaska, and N. Rostoker, Proc. 3d. Int. Topical Conf. on High Power Electron and Ion Beam Research and Technology, Novosibirsk, Jul. 1979; Appl. Phys. Lett. 36, 264 (1980) (without Prohaska).
W. Clark, P. Korn, A. Mondelli, and N. Rostoker, Phys. Rev. Lett. 37, 592 (1976).
L. S. Skaggs, G. M. Almy, D. W. Kerst, and L. H. Lanal, Phys. Rev. 70, 95 (1946).
R. Wideroe, Rev. Sci. Instr. 19, 401 (1948).
E. C. Crittenden and W. E. Parkins, J. Appl. Phys. 17, 444 (1946).
H. Boehmer, J. Munch, M. Caponi, *Free Electron Laser Experiment*, T.R.W. Preprint (1979).
P. Sprangle et al., NRL Mem. Rpt. 3911 (1978).
W. W. Destler, L. E. Floyd, and M. Reiser, Phys. Rev. Lett. 44, 70 (1980).

*Primary Examiner*—S. A. Cangialosi
*Attorney, Agent, or Firm*—Fitch, Even, Tabin & Flannery

[57] ABSTRACT

A method and means for accelerating charged particle beams having very high current densities to relativistic energies, as, for example, embodied in a betatron capable of carrying a current of many tens of kiloamperes at energies up to at least 300 Mev. The basic principle underlying the present invention is the containment of a beam of charged particles, more particularly a beam of electrons, by a magnetic field directed along the beam. As the strength of the magnetic field is increased as a function of time the beam of electrons becomes compressed in the direction transverse to the beam into a region of high charge density. The electrons may then be accelerated along the direction of the magnetic field to form an ultra-relativistic beam. At such high energies the beam tends to be stable and the containing magnetic field is no longer necessary. The magnetic field may therefore be permitted to decay.

18 Claims, 6 Drawing Figures

METHOD AND APPARATUS FOR ACCELERATING CHARGED PARTICLES

FIELD OF THE INVENTION

The present invention relates generally to the field of charged particle accelerators and more particularly to a method and apparatus by which an electron accelerator may be caused to carry extremely high currents, measured in kiloamperes, of relativistic electrons in a beam of small cross section.

BACKGROUND OF THE INVENTION

Very high current relativistic electron accelerators are presently required for free electron lasers as discussed in Sprangle, Smith, and Granatstein, *Free Electron Lasers and Stimulated Scattering from Relativistic Electron Beams*, N.R.L. Memorandum Report 3911 (1978) and Caponi, Munch, and Boehmer, *Optimized Operation of a Free Electron Laser*, etc., J. Quantum Elec. (to be published). Intense relativistic charged particle beams are also useful as intense gamma ray sources and for nuclear physics research.

Relativistic electron accelerators normally carry electron beam currents measured in micro- or milliamperes. A major obstacle to the achievement of higher currents is beam blowup due to charge instability at the time of injection of electrons.

The onset of beam blowup may be estimated by reference to a characteristic time which is the inverse of the beam plasma frequency. A characteristic blowup time, $t_b$, may be approximated by $$(ct_b)^2 = 2\pi \gamma^3 / n r_e \tag{1}$$

where c is the velocity of light, n the number density of electrons, and $r_e$ is the classical electron radius which is about $2.6 \times 10^{-13}$ cm. The relativistic time dilation factor, $\gamma$, is defined by $$\gamma = (1 - V^2/c^2)^{-\frac{1}{2}} \tag{2}$$

where V is the beam velocity at injection.

The injection current I, with cross-sectional dimension, a, is $$I = \pi e V n a^2 \tag{3}$$

e is the charge of the electron.

Beam blowup occurs when the characteristic blowup time, $t_b$, exceeds the residence time of the electrons in some characteristic acceleration length, l; that is, $t_b$ exceeds l/2 V. Consequently the injection current is limited by $$I << 8\pi^2 (a/l)^2 \gamma^3 (ec/r_e) (V/c)^3 \tag{4}$$

Taking l to be of the order of magnitude of 1 m. and a about 1 cm. gives $$I << 10^4 \gamma^3 (V/c)^3 \text{ amps.} \tag{5}$$

If the electrons are injected with energies of a few kilovolts, corresponding to V/c about 0.1, then space charge instability limits the injection current to be much smaller than a few amperes. The estimate in Eq. (5) also shows that when the beam becomes relativistic with (V/c) close to unity and $\gamma$ large, the space charge limit on the beam may be tens of kiloamperes.

For a more careful estimate of the limiting effect of space chage instability it is desirable to consider a specific geometry such as a conventional betatron.

Figure 1:
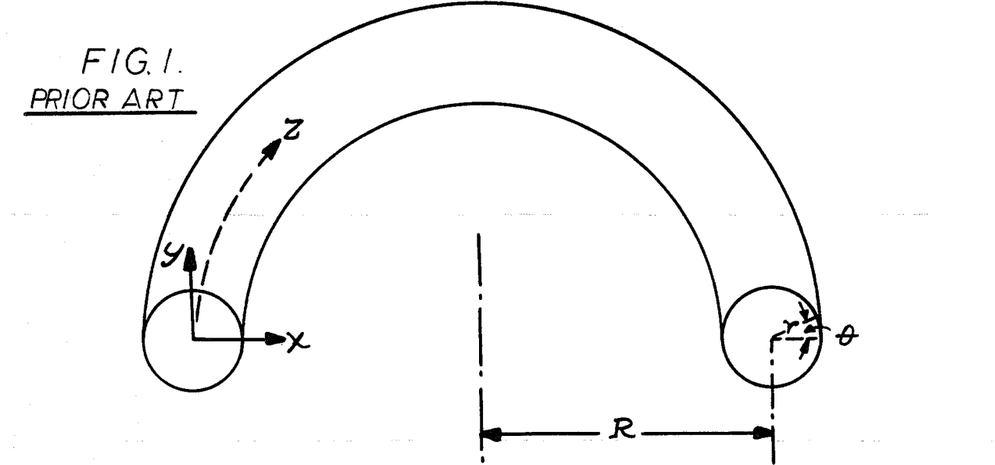
FIG. 1 is a diagrammatic illustration of the toroidal geometry and co-ordinates used in describing the prior art.

In order to describe the particle orbits of a toroidal electron beam in a conventional betatron consider the local coordinates (x,y) or (r,$\theta$) as illustrated in FIG. 1. The toroidal direction is indicated by z. If the velocity of the beam in the toroidal direction is large, $V >> v_x, v_y$, the equations of motion for an electron with mass m are approximately $$m\gamma \left( \frac{dv_x}{dt} + \frac{V^2}{R-x} \right) = -e \left\{ (E_r - \beta B_\theta) \frac{x}{r} - \beta B_y \right\} \tag{6}$$

$$m\gamma \frac{dv_y}{dt} = -e \left\{ (E_r - \beta B_\theta) \frac{y}{r} + \beta B_x \right\} \tag{7}$$

where R is the major radius of the beam axis.

$$E_r = -2Ner/a \tag{8}$$

and $$B_\theta = -2NeVr/ca \tag{9}$$

are the self-fields of the beam assumed to have uniform density. Also $$B_\theta = \beta E_r \tag{10}$$

where $$\beta = V/c. \tag{11}$$

$B_y$ is a vertical magnetic field which is the important magnetic field for a conventional betatron. $B_x$ is also important in a conventional betatron.

The self-field terms are $$(E_r - \beta B_\theta)/r = \frac{\omega_p^2}{2\gamma^2} (\gamma m) \tag{12}$$

where $\omega_p$ is the beam plasma frequency given by $$\omega_p^2 = 4\pi n c^2 r_e / \gamma \tag{13}$$

Assuming the betatron magnetic fields to be approximated near the z-axis by $$B_y = B \left( \frac{R}{R-x} \right)^s \simeq B \left( 1 + \frac{sx}{R} \right) \tag{14}$$

where s is the same fixed power, then the vanishing of the curl of the B-field implies $$B_x = sB(y/R) \tag{15}$$

The equations of motion then simplify to $$(d^2x/dt^2) - \Omega^2 x + \Omega_y^2 (1-s)x = 0 \tag{16}$$

$$(d^2y/dt^2) - \Omega^2 y + \Omega_y^2 sy = 0 \tag{17}$$

where $$\Omega^2 = \Omega_p^2 / 2\gamma^2 \tag{18a}$$

and $$\Omega y = eB/\gamma mc = V/R \qquad (18b)$$

Except for the $\Omega^2$ terms these are the standard betatron equations. The Betatron fields $B_x, B_y$ produce focusing and the self-fields produce the de-focusing terms $-\Omega^2 x$ and $-\Omega^2 y$. The condition for orbit stability is $$\Omega_y^2/2 > \Omega^2 \qquad (19)$$

or $$n < \gamma B^2/(4\pi mc^2) \qquad (20)$$

Then the current satisfies $$I < \gamma^3 (V/c)^3 (ec/r_o)(a/R)^2 \qquad (21)$$

which, for R about 1 m. and beam area about one cm² becomes approximately $\gamma^3(V/c)^3$ amperes. In the University of Illinois betatron the electrons were injected at about 100 Kev. The space charge limit on the current would therefore be of the order of a hundred milliamperes, according to Eq. (21), consistent with experience.

Inductive charging is a known technique for confinement of non-neutral plasmas with high charge densities. The technique, in principle, involves the introduction of charged particles into a continuous region of cylindrical cross-section. A uniform, axial magnetic field, is then created in the containment region by causing current to increase in a solenoid surrounding the cylindrical region. As the magnetic field increases, the charged particles are forced to move toward the center of the cylindrical confinement region, thereby creating an inner cylindrical of high charge density.

Inductive charging of a torus has been discussed by Clark, Korn, Mondelli, and Rostoker, Phys. Rev. Lett. 37, 592 (1976).

In accordance with the present invention the injection problem for accelerators is solved by the method of inductive charging. This method involves a longitudial magnetic field $B_z$ and thermionic electron injectors near the edge of the accelerator. Electrons are injected when the magnetic field $B_z$ is low. The field is then increased thereby compressing the electrons into a small cylindrical region at the center of the accelerator.

The charge limit may be evaluated from the equations of motion with $B_x$, $B_y$, eliminated but with the longitudinal field $B_z$, included. The initial concern is with trapping rather than accelerating electrons; V is therefore set to zero. The equations of motion are $$(d^2x/dt) - \Omega^2 x + \Omega_z(dy/dt) = 0 \qquad (22)$$

$$(d^2y/dt^2) - \Omega^2 y - \Omega_z(dx/dt) = 0 \qquad (23)$$

where $$\Omega_z = eB_z/mc. \qquad (24)$$

The condition for stability is $\Omega_z^2 > 4\Omega^2$ or $$n \leq B_z^2/(8\pi mc^2) \qquad (25)$$

For $B_z$ about one kilogauss the space charge limit is $n = 6 \times 10^{11}$ cm$^{-3}$, corresponding to a current in a beam of about 1 cm radius after acceleration of about 10 kiloamperes.

The method of injection by inductive charging therefore promises an improvement of 4–6 orders of magnitude in beam current in electron accelerators.

Use of inductive charging in an accelerator having a toroidal geometry in fact requires a large beam current during injection. A lower limit on the beam current arises from the inherent small inhomogeneity of the magnetic field within a toroidal solenoid. The small inhomogeneity may be calculated, for example, by following Bleaney, B. I. and Bleaney B., *Electricity and Magnetism*, London, Oxford University Press, 1957, pp. 133–134. The magnetic field near the z-axis is $$B_z = B_{zo}R(R-x)^{-1} \approx B_{zo}(1+x/R) \qquad (26)$$

where use is made of the fact that $x/R$ is small close to the z-axis and a rectangular coil is assumed. In Eq. (26) $B_{zo}$ is the field at the origin of the x-axis and the positive x-direction is taken to be toward the major axis of the torus.

The effect of the $(1+x/R)$ factor in Eq. (26) is to modify Eqs. (22) and (23) by replacing $\Omega_z$ in those equations by $\Omega_z(1+x/R)$ where $\Omega_z$ is now defined by Eq. (24) with $B_z$ replaced by $B_{zo}$.

Approximate solutions to the modified Eqs. (22) and (23) are obtainable by a formal expansion in 1/R. Also, it is assumed that $\Omega/\Omega_z$ is small because $\Omega$ is proportional to the current density and the existence of a lower limit on the current density is being shown.

The lowest order $(R = \infty)$ solutions to Eqs. (22) and (23) are $$x = (X - \rho \cos \alpha) \cos \omega t - (Y - \rho \sin \alpha) \sin \omega t + \rho \cos (\Omega_z t + \alpha) \qquad (27)$$

$$y = (Y - \rho \sin \alpha) \cos \omega t + (X - \rho \cos \alpha) \sin \omega t + \rho \sin (\Omega_z t + \alpha) \qquad (28)$$

where X and Y are the initial values of x and y and $$\omega = \Omega^2/\Omega_z < < \Omega_z \qquad (29)$$

Eqs. (27) and (28) describe a rapid circular gyration of radius $\rho$ and frequency $\Omega_z$ about a guiding center. The guiding center drifts around the z-axis in a circle of radius $$R_d = [(X - \rho \cos \alpha)^2 + (Y - \rho \sin \alpha)^2]^{\frac{1}{2}} \qquad (30)$$

which may be much larger if either X or Y is substantially larger than $\rho$. The velocity of the rapid circular gyration is given by $$V_{perp} = \rho \Omega_z \qquad (31)$$

The 1/R corrections to Eq. (27) and (28), denoted by $x_1$, $y_1$, are obtained by substituting the lowest order solutions in the non-linear terms of Eqs. (22) and (23) modified according to Eq. (26) and solving the resulting linear equations for $x_1$, $y_1$. The non-linear terms are now "driving terms" for the new equations and will consist in general of constants and oscillating terms having as frequencies sums, differences, and multiples of the frequencies $\Omega$ and $\Omega_z$. Ignoring the oscillating terms, which result in small perturbations to the orbit given by Eqs. (27) and (28) and keeping only the constant term results in the equations $$(d^2/dt^2)x_1 - \Omega^2 x_1 + \Omega_z(d/dt)y_1 = -\tfrac{1}{2}\rho^2\Omega_z^2/R \quad (32)$$

$$(d^2/dt^2)y_1 - \Omega^2 y_1 - \Omega_z(d/dt)x_1 = 0 \quad (33)$$

with the initial conditions $$x_1 = y_1 = (d/dt)x_1 = (d/dt)y_1 = 0 \quad (34)$$

Inspection of Eq. (32) shows that the constant "driving term" on the right is eliminated by the substitution $$x_1 \rightarrow x_1 + \rho^2\Omega_z^2/(2R\Omega^2) \equiv x_1 + V^2_{perp}/2R\Omega^2 \quad (35)$$

corresponding to a shift in the guiding center in the x-direction by an amount $$x_o = V^2_{perp}/2R\Omega^2 \quad (36)$$

In order to have a stable beam it is necessary that the guiding center shift be less than about the beam radius a. Use of the defining Eqs. (13) and (18a), with $\gamma$ taken as unity to correspond to injection conditions then gives as a stability condition on N, the line density of electrons $$N = \pi a^2 n > \tfrac{1}{2}(a/R)mV^2_{perp}/e^2 \quad (37)$$

Assuming that a is about 1 cm., R about 1 m., and $(\tfrac{1}{2})mV^2_{perp}$, the injection energy, is about 15 Kev before $B_z$ increases, corresponding to about 100 Kev after $B_z$ is increased, gives as a result that N must be greater than about $10^9$ cm$^{-1}$. After acceleration the minimum current is $$I_e = Nec > 10A. \quad (38)$$

Higher injection energies will, of course, require larger minimum currents.

The limit given by Eq. (38) emphasizes the difference between an inductively charged accelerator and a conventional cyclic accelerator. In known cyclic accelerators there is never a magnetic field $B_z$. This is because a toroidal magnetic field $B_z$ is always slightly inhomogeneous as in Eq. (26). The inhomegeneity would always cause particles to drift into the accelerator wall in a short time if the current or particle density were very small as it is in a conventional cyclic accelerator. However a large particle density introduces a new physical effect, namely, the circular particle drift due to the self-electric field of the beam. This drift can cancel the drift caused by the magnetic field inhomogeneity if the electron density or final beam current is sufficiently large.

Toroidal magnetic fields are known in connection with tokamaks where they also give rise to a drift which must be corrected. However, the method of correction described in connection with the present invention would not be applicable to a tokamak because tokamaks contain neutral plasma and there can be no self electric field for the plasma.

Eqs. (22) and (23) describe the particle orbits before acceleration in the z direction. When acceleration takes place $\Omega^2$ decreases as $\gamma$ increases, as shown in Eq. 18(a), and eventually becomes too small to correct the toroidal drift. However when $\gamma$ is large, space charge is no longer a problem and there is no need to have the toroidal field $B_z$ which is introduced only to control space charge at low energy when $\gamma$ is close to unity. At large $\gamma$ the toroidal field may be permitted to decay so that drift from the toroidal field inhomogeneity need not be compensated.

OBJECTS OF THE INVENTION

The general object of the invention is to provide a method and means for accelerating charged particle beams having very high current densities to relativistic energies.

A more particular object is to provide a betatron capable of carrying a current of many tens of kiloamperes at energies up to at least 300 Mev.

SUMMARY OF THE INVENTION

The basic principle underlying the present invention is the containment of a beam of charged particles, more particularly a beam of electrons, by a magnetic field directed along the beam. As the strength of the magnetic field is increased as a function of time the beam of electrons becomes compressed in the direction transverse to the beam.

As a feature of the present invention low energy electrons are introduced into an evacuated region. The evacuated region, at the time of injection, contains a relatively low intensity magnetic field which is uniform across the cross section and directed perpendicularly to the cross section.

As the low energy electrons are introduced into the cross section the magnetic field is caused to increase, thereby compressing the electrons into a region of high charge density. The electrons may then be accelerated along the direction of the magnetic field to form an ultra-relativistic electron beam. At such high energies the beam tends to be stable and the containing magnetic field is no longer necessary. The magnetic field may therefore be permitted to decay.

BRIEF DESCRIPTION OF THE DRAWINGS

The foregoing and other objects and features of the invention may be better understood by reference to a particular construction embodied as a betatron, with the help of the following drawings.

DETAILED DESCRIPTION

In FIG. 1 is illustrated a generalized diagram of the toroidal geometry and coordinates illustrating systems in the prior art as described above. FIGS. 2-6 illustrate the method and apparatus of the present invention.

1. The Betatron Structure

Figure 2:
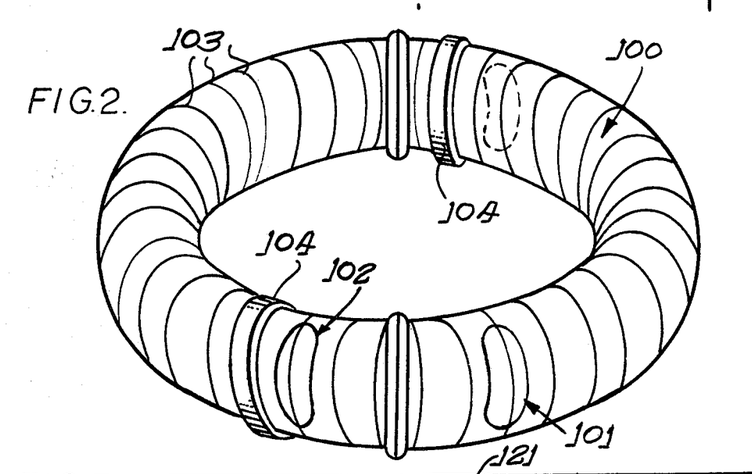
FIG. 2 is an isometric view of the torus used in a specific construction of a betatron in accordance with the present invention.

A specific construction of a preferred embodiment of the invention designed to accelerate 100 Mev electrons may consist of a hollow glass torus 100 as shown in FIG. 2. The illustrated torus 100 has a 1 meter major radius and a 10 cm. minor radius. A pumping port 101 provides access for evacuating the torus 100 to a pressure of less than $10^{-7}$ torr. Means for pumping may consist of a 100 liter/sec. turbomolecular pump assisted by a cold trap and a small sublimation pump as is known to be sufficient by persons conversant with the art of electron accelerator design.

One or more injection ports 102 in the torus 100 are used for injecting electrons into the torus 100. Other ports may be provided for making beam and magnetic field measurements and for beam extraction. Persons of ordinary skill in the art of betatron design will know how to design and place such ports.

Figure 6:
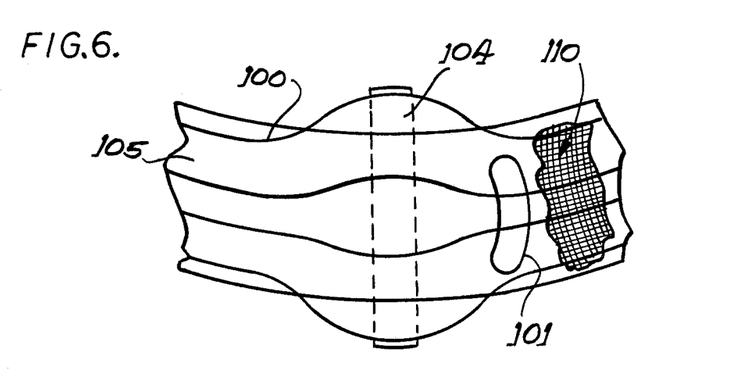
FIG. 6 is a partial view of the torus shown in FIG. 2 with magnetic field lines showing the distortion of the toroidal magnetic field lines during injection.

The torus 100 is wound with a layer of copper wire 103 so that current flowing in the copper wire 103 will provide an approximately homogeneous toroidal magnetic field 105 as indicated in FIG. 6. An epoxy fiberglass coat on the outside wall of the torus 100 comprises a bed for the wire. A copper washer 104 is placed around the torus 100 near each injection port 102 as shown in FIG. 2.

Figure 4:
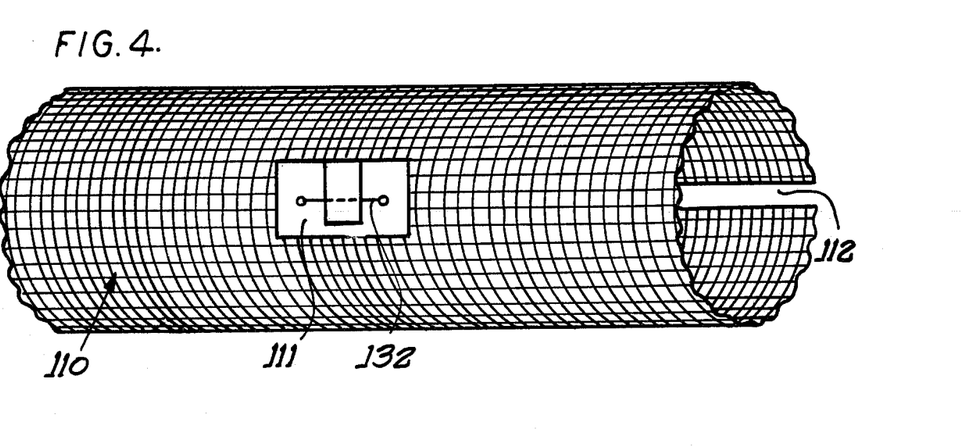
FIG. 4 is an isometric view of a grounded screen liner with filament and anode in place as used in the betatron shown in FIG. 3.
Figure 5:
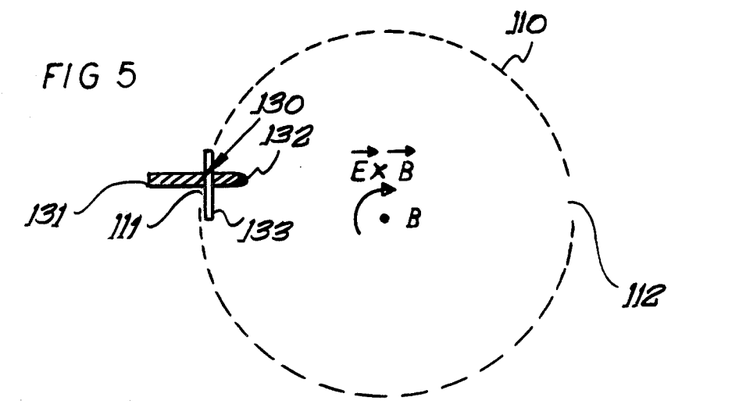
FIG. 5 is a cross-sectional transverse view of the grounded screen liner shown in FIG. 4.

The inside of the torus 100 is lined with a conducting metal screen liner 110 such as the liner 110 shown in FIGS. 4 and 5. The liner 110 is connected to ground potential.

A window 111 is cut in the liner 110 where the liner 110 would otherwise cover the injection port 102 of the torus 100. An open slot 112 is left in the liner 110 along the entire inner circumference of the torus 100, as shown in FIGS. 4 and 5. The slot is centered on an imaginary plane normal to the symmetry axis of the torus 100 and bisecting the torus 100. The width of the slot is approximately 2 mm. in the preferred embodiment, but is not particularly critical.

Figure 3:
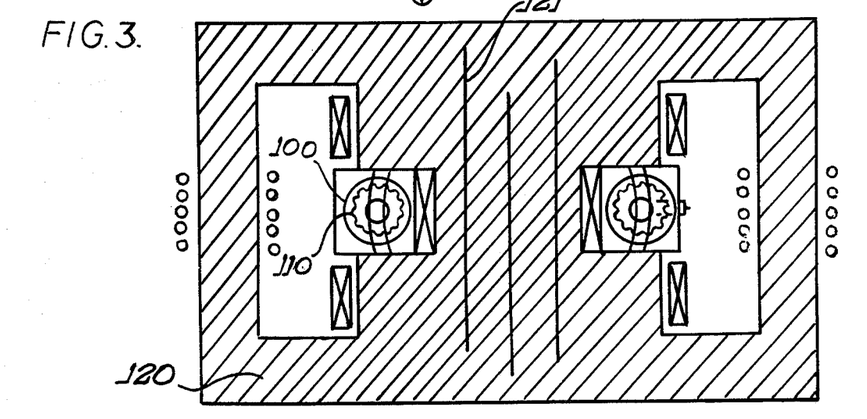
FIG. 3 is a cross-sectional view, partly schematic, of a high current betatron with inductive charging in accordance with the present invention, and using the torus shown in FIG. 2, the section being taken through the major axis of the betatron.

The torus 100 may be placed in an iron core transformer 120 as shown in FIG. 3. The transformer is used to provide a vertical, time changing magnetic field 121 and a toroidal, time changing electric field as is well known to persons of ordinary skill in the art of betatron design. The direction along the symmetry axis of the torus 100 is referred to herein as the vertical direction in the embodiment as is appropriate with respect to FIG. 2.

2. Thermionic Injector 130

A thermionic injector 130 is used in the illustrated embodiment for injecting electrons into the torus 100. The thermionic injector 130 comprises a holder 131, a filament 132, and an anode 133, as shown in FIGS. 4 and 5.

The holder 131 may be made of ceramic material. It projects into the vacuum chamber through a vacuum seal at the location of the injection port 102. The projection distance is made adjustable by means of an adjustment assembly. The holder 131 may contain wires necessary for heating and applying voltages to the anode 133 and filament 132.

The holder 131 also projects through the anode 133 which fits snugly against the interior of the vacuum seal over the injection port 102. The anode 133 may be made of molybdenum, which has suitable properties for use at high temperatures in a high vacuum environment. The anode 133 is connected by wire to a voltage source providing the desired positive potential.

The filament 132 is attached to the end of the holder 131 that projects into the torus 100. The filament 132 is attached to wires that provide a heating current and also a negative pulsed voltage.

3. Injection

Injection of electrons into the torus 100 occurs in pulses lasting approximately 10 microseconds, and approximately $2 \times 10^{16}$ electrons are injected with each pulse in a preferred embodiment within the teaching of the invention.

Current in the copper wire 103 may be applied by conventional means to give a toroidal magnetic field 105 of approximately 100 gauss at the beginning of injection increasing to approximately 1 kilogauss at the end in the preferred embodiment. The toroidal magnetic field 105 is then permitted to decay to its initial value when the electrons are accelerated to relativistic velocities around the torus 100.

At the beginning of injection, the filament 132 is pulsed with a negative voltage of approximately 15 kilovolts. In other constructions both anode 133 and cathode filament 132 could be pulsed. The filament 132 is maintained at a temperature of approximately 1000 degrees centigrade.

Persons of ordinary skill in the art of accelerator design will understand that the voltage pulse applied to the filament 132 will cause electrons to be emitted from the filament 132. The electrons distribute themselves around the torus 100 under the influence of the electric and magnetic fields present. The electric field is the resultant of contributions from the self-electric field of the electron space charge, the applied electric field due to the voltage pulse on the filament 132, and the induced electric field caused by the increase in the toroidal magnetic field 105. The principal magnetic field present is the toroidal field which is temporarily distorted in the region inside the washers 104. The net effect of the combined fields is, as stated, to cause the electrons to distribute themselves around the torus 100, the electrons being reflected from the distorted regions.

The grounded screen liner 110 causes the electric field lines to remain perpendicular to the walls of the torus 100; the liner 110, a good conductor, does not permit a tangential electric field on its surface as is well known to persons of ordinary skill in the art.

During the voltage pulse the toroidal magnetic field 105 is increasing. The copper washer 104 around the torus 100 near the injection port distorts the toroidal magnetic field 105 while the field is rising, keeping the toroidal magnetic field 105 weak in the vicinity of the ring, as shown in FIG. 6. The toroidal magnetic field 105 will subsequently become homogeneous as it diffuses into the copper washer 104. The diffusion time is governed by the resistivity of the copper washer 104, as explained in Jackson, J. D., *Classical Electrodynamics*, N.Y., John wiley & Sons, 1962, p. 313. The temporary distortion of the toroidal magnetic field 105 causes the temporary formation of mirror points in the magnetic field. The use of mirror points is well-known to persons of ordinary skill in the closely related art of plasma confinement.

The electrons will spiral around the field lines of the toroidal magnetic field 105. The toroidal magnetic field 105 will therefore act as a guide field to prevent the electron beam from exploding into the walls as a result of space charge forces.

The toroidal magnetic field 105 will increase during the approximately 100 micro-seconds after injection, compressing the electrons within the torus 100 into a beam of two to three centimeters radius. At that time the electrons drift in the "ExB" direction as indicated in FIG. 5. The electric field, E, is the self-field of the beam due to space charge, and the magnetic field, B, is the toroidal guide field.

4. Acceleration

A major innovative feature of the invention is the presence of an increasing toroidal magnetic field 105 before the betatron acceleration process. As explained in discussing the theory of operation, the toroidal magnetic field 105 permits extremely large betatron currents to be accelerated without space-charge instability losses.

Acceleration of the electrons occurs through the normal betatron process. A conventional betatron is illustrated in FIG. 3. The vertical magnetic field 121 is caused to rise thereby inducing a toroidal electric field to accelerate the electrons.

Once the electrons have reached relativistic energy, the beam will be stable against space charge instability, as discussed in the theory of operation. The toroidal magnetic field 105 may then be permitted to decay to its value at the beginning of injection.

A particular embodiment designed for an electron beam energy of 100 Mev may have a line density of a few times $10^{13}$ electrons/cm. The corresponding circulating current may be in the range of 100–200 kiloamperes, which is far greater than has ever been achieved in any betatron heretofore.

5. Beam Extraction

Some uses of an embodiment may require extraction of the electron beam after it is accelerated to full energy and the toroidal magnetic field 105 is negligible. Persons of ordinary skill in the art of accelerator design are acquainted with numerous practical methods for extracting electron beams from betatrons that will be applicable within the teachings of the invention.

6. Design Modification

There are many possible modifications which persons skilled in the art of accelerator design may make to the embodiment without altering the principles of the invention described herein. The toroidal magnetic field 105 may be made much stronger at its peak value, thereby permitting injection of much greater charge and increase in circulating electron current. The dimensions of the torus 100 may be increased or decreased. The energy of the electron beam may be made much greater or much less than 100 Mev. Superconducting, or other magnets, may be used to create the required magnetic fields.

Although the present embodiment is a betatron, the betatron configuration is not essential to the invention. Linear accelerator configurations and circular accelerator configurations other than the betatron may be used within the scope of the teachings of this invention.

The dynamical principles embodied in the present invention do not require the use of electrons, as opposed to positrons for a specific embodiment. Therefore, although the specific construction described herein uses an electron source, other embodiments utilizing positron sources are within the teachings of the present invention. Charged particles heavier than electrons and positrons may also be injected into accelerators and accelerated in accordance with the principles of the present invention.

It will, of course, be understood that modification of the present invention in its various aspects will be apparent to those skilled in the art, some being apparent only after study and others being a matter of routine design. As such, the scope of the invention should not be limited by the particular embodiment and specific construction herein described, but should be defined only by the appended claims and equivalents thereof.

Various features of the invention are set forth in the following claims.

What is claimed is:

1. A method for accelerating charged particles to ultra-relativistic energies along a path characterized by a radius R which may be infinite, comprising the steps of introducing charged particles, each having predetermined charge e and predetermined mass m, at low energy $(\frac{1}{2})mV^2$, V being the average velocity of the particles perpendicular to the path, into an evacuated containment region encompassing the path;

applying a magnetic field of increasing intensity to the containment region, with the field lines substantially parallel to the path so as to compress the charged particles in the containment region in the directions transverse to the path to a density n substantially contained in a region along the path characterized by an average radius a, the density n being approximately related to a beam blow-up time $t_b$ in the absence of the magnetic field by the formula $$(ct_b)^2 = 2\pi/nr_e,$$

c being the velocity of light and $r_e$ the classical electron radius, the density n corresponding to a line density N satisfying the inequality $$N > \tfrac{1}{2}(a/R)(mV^2)/e^2;$$

and accelerating the charged particles substantially along the path to ultra-relativistic energies more than about 100 Mev to form a beam along the path while using the applied magnetic field parallel to the path to inhibit the loss of charged particles forming the beam occasioned by space charge effects acting prior to acceleration to ultra-relativistic energies, the time $t_b$ being substantially less than the time required to accelerate the charged particles to ultra-relativistic energies.

2. The method of claim 1 wherein charged particles having the rest mass of an electron are introduced.

3. The method of claim 1 wherein the containment region is an evacuated torus and the magnetic field is approximately toroidal.

4. The method of claim 3 wherein charged particles having the rest mass of an electron are introduced, and such particles are accelerated by a betatron mechanism.

5. The method of any of the claims 1 through 4 wherein the magnetic field applied at the beginning of the path has a substantial predetermined magnitude at the beginning of the time of introduction of charged particles into the containment region.

6. The method of claim 5 wherein the magnetic field substantially parallel to the path returns to said predetermined magnitude after the charged particles are accelerated to ultra-relativistic energies.

7. A device for accelerating charged particles, each having predetermined charge e and predetermined mass m, to ultra-relativistic energies along a path characterized by a radius R which may be infinite, comprising
means defining an evacuated containment region encompassing the path;
means for providing a magnetic field having field lines substantially parallel to the path direction;
means for introducing the charged particles having predetermined charges at low energy $(\frac{1}{2})mV^2$, V being the average velocity of the particles perpendicular to the path, into the evacuated containment region;
means for increasing the intensity of the magnetic field during and after the time the charged particles are introduced into the containment region so as to compress the charged particles in the containment region in the direction transverse to the path direction to a density n substantially contained in a region along the path characterized by an average radius a, the density n being approximately related to a beam blow-up time $t_b$ in the absence of the magnetic field by the formula $$(ct_b)^2 = 2\pi/nr_e,$$

c being the velocity of light and $r_e$ the classical electron radius, the density n corresponding to a line density N satisfying the inequality $$N > \frac{1}{2}(a/R)(mV^2)/e^2;$$

and
means for accelerating the charged particles to ultra-relativistic energies more than about 100 Mev to form a beam along the path while the loss of charged particles from the beam occasioned by space charge effects is inhibited, the time $t_b$ being substantially less than the time required to accelerate the charged particles to ultra-relativistic energies,
the magnetic field parallel to the path direction inhibiting the loss of charged particles from the beam due to space charge effects acting prior to acceleration to ultra-relativistic energies.

8. The device of claim 7 wherein the means for introducing charged particles introduces particles having the rest mass of an electron.

9. The device of claim 8 wherein the means for introducing charged particles into the evacuated containment region includes a thermionic injector.

10. The devices of claims 8 or 9 wherein the means for introducing charged particles into the evacuated containment region includes an anode and a cathode such that the anode is substantially adjacent to the boundary of the containment region and the cathode projects substantially into the containment region.

11. The device of claim 8 wherein the means for accelerating the charged particles is a magnet providing a betatron field.

12. The device of claim 7 wherein the means for introducing the charged particles into the containment region includes a conducting metal screen liner substantially surrounding at least a part of the containment region and maintained at a predetermined potential.

13. The device of claim 7 wherein the means for introducing the charged particles into the containment region includes a conducting metal ring linking a portion of the magnetic field aligned with the path which locally inhibits changes in the aforesaid magnetic field, thereby creating a temporary magnetic mirror during the time the aforesaid magnetic field is increasing.

14. An injection system for a betatron with a substantially circular electron acceleration path of radius R, said system comprising means for increasing for a time the intensity of a toroidal magnetic field within the betatron and directed along the electron acceleration path, and means for injecting electrons with average velocity V perpendicular to the acceleration path into the betatron during the beginning of the time of increase to provide a line density of electrons N in a beam of average radius a satisfying the condition, $$N > \frac{1}{2}(a/R)(mV^2)/e^2,$$

m being the mass of an electron and e its charge, the line density N also being sufficient to provide, after acceleration by the betatron, a beam of ultra-relativistic electrons with energies greater than about 100 Mev and with a current greater than about 100 kilo-amperes, after a betatron acceleration time t satisfying the condition $$(ct)^2 >> 2\pi/nr_e,$$

where c is the velocity of light, $r_e$ the classical electron radius, and n the density of electrons after injection.

15. In an evacuated toroidal device for containment of charged particles into which charged particles including ions and electrons are injected, wherein the injection is accomplished with the aid of a toroidal magnetic field within the toroidal device that increases in intensity during injection,
an improvement comprising one or more conducting metal structures having predetermined resistivity and associated diffusion time for a magnetic field to diffuse into the metal structures linking the toroidal magnetic field,
placed to inhibit locally and temporarily during a time period of about the diffusion time the growth of the magnetic field in localized regions within the toroidal device,
thereby providing magnetic mirror points within the toroidal device to contain the ions and electrons within specified regions of the toroidal device during the diffusion time.

16. The improvement according to claim 15 wherein said conducting metal structures comprise metal rings closely surrounding the minor circumference of the toroidal device.

17. A method for accelerating charged particles to ultra-relativistic energies along a path characterized by a radius R which may be infinite, comprising the steps of
introducing charged particles, each having predetermined charge e and predetermined mass m, at low energy $(\frac{1}{2})mV^2$, V being the average velocity of the particles perpendicular to the path, into an evacuated containment region encompassing the path;
applying a magnetic field of increasing intensity to the containment region, with the field lines substantially parallel to the path so as to compress the charged particles in the containment region in the directions transverse to the path to a density n substantially contained in a region along the path characterized by an average radius a, the density n being approximately related to a beam blow-up time $t_b$ in the absence of the magnetic field by the formula $$(ct_b)^2 = 2\pi/nr_e,$$

C being the velocity of light and $r_e$ the classical electron radius, the density n corresponding to a line density N satisfying the inequality $$N > (\tfrac{1}{4})(a/R)(mV^2)/e^2;$$

and accelerating the charged particles substantially along the path to ultra-relativistic energies greater than about twice the rest mass of the charged particles to form a beam along the path while using the applied magnetic field parallel to the path to inhibit the loss of charged particles forming the beam occasioned by space charge effects acting prior to acceleration to ultra-relativistic energies, the time $t_b$ being substantially less than the time required to accelerate the charged particles to ultra-relativistic energies, the step of introducing charged particles into the containment region including the provision of at least one conducting metal structure linking a portion of the magnetic field aligned with the path which locally inhibits changes in the magnetic field to create a temporary magnetic mirror during the time the magnetic field is increasing.

18. A device for accelerating charged particles, each having predetermined charge e and predetermined mass m, to ultra-relativistic energies along a path characterized by a radius R which may be infinite, comprising means defining an evacuated containment region encompassing the path;

means for providing a magnetic field having field lines substantially parallel to the path direction;

means for introducing the charged particles having predetermined charges at low energy $(\tfrac{1}{2})mV^2$, V being the average velocity of the particles perpendicular to the path, into the evacuated containment region;

means for increasing the intensity of the magnetic field during and after the time the charged particles are introduced into the containment region so as to compress the charged particles in the containment region in the direction transverse to the path direction to a density n substantially contained in a region along the path characterized by an average radius a, the density n being approximately related to a beam blow-up time $t_b$ in the absence of the magnetic field by the formula $$(ct_b)^2 = 2\pi/nr_e,$$

c being the velocity of light and $r_e$ the classical electron radius, the density n corresponding to a line density N satisfying the inequality $$N > (\tfrac{1}{4})(a/R)(mV^2)/e^2;$$

and means for accelerating the charged particles to ultra-relativistic energies greater than about twice the rest mass of the charged particles to form a beam along the path while the loss of charged particles from the beam occasioned by space charge effects is inhibited, the time $t_b$ being substantially less than the time required to accelerate the charged particles to ultra-relativistic energies; and the magnetic field parallel to the path direction inhibiting the loss of charged particles from the beam due to space charge effects acting prior to acceleration to ultra-relativistic energies, the means for introducing the charged particles into the containment region including a conducting metal structure linking a portion of the magnetic field aligned with the path which locally inhibits changes in the magnetic field to create a temporary magnetic mirror during the time the magnetic field is increasing.

* * * * *

UNITED STATES PATENT AND TRADEMARK OFFICE
CERTIFICATE OF CORRECTION

PATENT NO. : 4,392,111
DATED : July 5, 1983
INVENTOR(S) : Norman Rostoker

It is certified that error appears in the above-identified patent and that said Letters Patent is hereby corrected as shown below:

Column 1, line 53, "1" should read --$\ell$--.

Column 1, line 54, "1/2 V" should read --$\ell/2V$--.

Column 1, line 59, "1" should read --$\ell$--.

Column 2, line 4, "chage" should read --charge--.

Column 3, line 30, "continuous" should read --containment--.

Column 3, line 37, "cylindrical" should read --cylinder--.

Column 5, line 17, Equation 36, "$x_o = v^2_{perp}/2R\Omega^2$" should read --$x_o = v^2_{perp}/2R\Omega^2$--.

*Signed and Sealed this*

*Eleventh* Day of *October 1983*

[SEAL]

Attest:

GERALD J. MOSSINGHOFF

*Attesting Officer*   Commissioner of Patents and Trademarks